United States Patent [19]

Juhl et al.

[11] Patent Number: 5,022,902
[45] Date of Patent: Jun. 11, 1991

[54] ADSORBENT PACKAGE THAT IS RESISTANT TO HIGH TEMPERATURE

[75] Inventors: Daniel L. Juhl, Centerville; Raymond B. Wood, Brookville, both of Ohio

[73] Assignee: Stanhope Products Company, Brookville, Ohio

[21] Appl. No.: 525,475

[22] Filed: May 18, 1990

Related U.S. Application Data

[63] Continuation-in-part of Ser. No. 427,444, Oct. 26, 1989, abandoned.

[51] Int. Cl.⁵ .............................................. B01D 53/04
[52] U.S. Cl. ......................................... 55/387; 55/389; 55/515; 210/282
[58] Field of Search ................ 55/387, 389, 515, 516; 210/282; 426/126

[56] References Cited

U.S. PATENT DOCUMENTS

| 1,050,706 | 1/1913 | Taylor | 55/387 X |
|---|---|---|---|
| 2,623,607 | 12/1952 | Bottum | 55/387 X |
| 2,649,923 | 8/1953 | Woppman | 55/387 |
| 2,732,074 | 1/1956 | Kuthe | 55/387 X |
| 2,770,317 | 11/1956 | Bottum | 55/387 |
| 2,982,659 | 5/1961 | Mote | 426/126 |
| 3,191,849 | 6/1965 | Gutowski et al. | 426/126 X |
| 3,309,849 | 3/1967 | Ward | 55/387 |
| 3,343,663 | 9/1967 | Seidler | 426/126 |
| 3,556,816 | 1/1971 | Nughes | 426/126 |
| 3,572,499 | 3/1971 | Mondano | 426/126 X |
| 3,580,464 | 5/1971 | Griffith | 426/126 X |
| 3,755,994 | 9/1973 | Bidiwala | 55/387 |
| 4,111,005 | 9/1978 | Livesay | 55/387 X |
| 4,116,649 | 9/1978 | Cullen et al. | 55/387 |
| 4,272,264 | 6/1981 | Cullen et al. | 55/387 |
| 4,360,551 | 11/1982 | Guarino et al. | 426/126 X |
| 4,401,447 | 8/1983 | Huber | 55/387 |
| 4,457,843 | 7/1984 | Cullen et al. | 55/387 X |
| 4,464,261 | 8/1984 | Cullen et al. | 55/387 X |
| 4,619,673 | 10/1986 | Cullen et al. | 55/387 |
| 4,756,726 | 7/1988 | Peace | 55/387 X |
| 4,830,643 | 5/1989 | Sassa et al. | 55/387 X |

FOREIGN PATENT DOCUMENTS 993981 6/1965 United Kingdom ............... 426/126

Primary Examiner—Robert Spitzer
Attorney, Agent, or Firm—Robert W. Becker & Associates

[57] ABSTRACT

An adsorbent package that is resistant to high temperature. The package comprises a bag that contains adsorbent, and a foil wrapping that is disposed about a portion of the bag, with the foil wrapping having a first side that is disposed adjacent the bag and is laminated with a heat sealing material via which the foil wrapping is connected to the material of the bag.

9 Claims, 1 Drawing Sheet

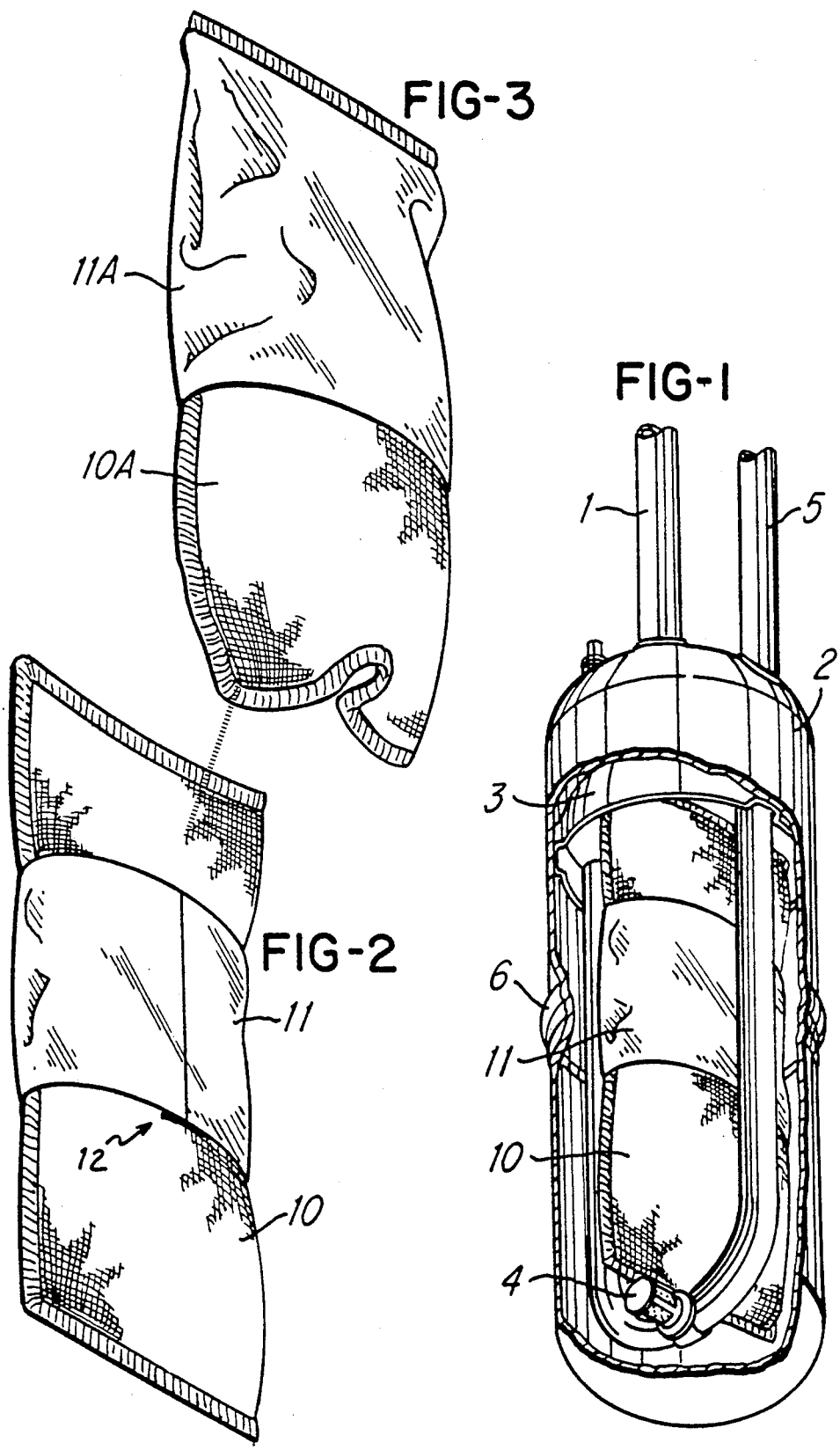

ADSORBENT PACKAGE THAT IS RESISTANT TO HIGH TEMPERATURE

This is a continuation-in-part application of Ser. No. 427,444 filed Oct. 26, 1989, now abandoned.

BACKGROUND OF THE INVENTION

The present invention relates to an adsorbent package that is resistant to high temperature.

Adsorbent packages or bags, also known as desiccant bags, are used in refrigerant dryers to adsorb moisture from the refrigerant. In particular, moisture adsorbs to the surface of the pores in the material of such a bag. Examples of adsorbent bags of this general type are described in U.S. Pat. No. 4,116,649, Cullen et al, issued Sept. 26, 1978, and U.S. Pat. No. 4,401,447, Huber, issued Aug. 30, 1983.

The problem with heretofore known bags of this type is that when the sections of the receiver, in the form of a can or other container, are welded together, the heat is too great for adjacent portions of a bag; as a consequence, the bag can become scorched, can melt, or can otherwise be damaged, thereby totally destroying or at least greatly impairing the ability of the bag to contain the adsorbing materials and to eliminate any possibility of loose materials damaging the system. A solution to this problem was proposed in U.S. Pat. No. 3,755,994, Bidiwala, issued Sept. 4, 1973. Pursuant to this patent, a sheet of metal foil is fastened to the bag by being stitched thereto. Unfortunately, this is not a very economical and also not always a reliable way of securing the foil to the bag.

It is therefore an object of the present invention to not only provide means for protecting an adsorbent package or bag from high heat yet still allow sufficient surface area for the bag to be effective, but also to do so in an economical and reliable manner.

BRIEF DESCRIPTION OF THE DRAWING

This object, and other objects and advantages of the present invention, will appear more clearly from the following specification in conjunction with the accompanying schematic drawing, in which:

FIG. 1 illustrates one possible application of an inventive adsorbent package;

FIG. 2 illustrates one exemplary embodiment of the inventive adsorbent package; and FIG. 3 illustrates another exemplary embodiment of an inventive adsorbent package.

SUMMARY OF THE INVENTION

The adsorbent package of the present invention is characterized primarily by a bag that contains adsorbent, and by a foil wrapping that is disposed about a portion of the bag, with an adsorbent package that is resistant to high temperature, comprising: a bag that contains adsorbent; and a foil wrapping that is disposed about a portion of the bag, with the foil wrapping having a first side that is disposed adjacent the bag and is laminated with a heat sealing material via which the foil wrapping is connected to the material of the bag.

The foil wrapping, which is disposed about that port±on of the bag that is subjected to high heat when the sections of a receiver can are welded together acts as a heat shield or thermal barrier to protect the bag, but still allows sufficient surface area to be exposed so that the bag can effectively perform its adsorbent function. Just as importantly, the lamination of that side of the foil wrapping that is disposed against the bag allows the foil wrapping to be securely fastened to the bag without having to be stitched thereto.

Pursuant to one preferred embodiment of the present invention, the foil wrapping is made of aluminum, and the heat sealing material is polyethylene. The foil wrapping is then connected to the bag by being heat sealed thereto, for example at about 350° F. The foil wrapping has two ends that preferably overlap one another. So that these overlapping ends will also adhere to one another, that side of the foil wrapping remote from the bag is laminated with nylon.

In addition, the foil wrapping can be disposed in the vicinity of either end of the bag, or closer to the central portion of the bag, depending upon where the heat shield effect is required In order to leave enough surface area of the bag free, the foil wrapping is preferably disposed about up to 50% of the bag surface.

The bag itself is preferably made of plastic fibrous material, such as, by way of example only, polyester felt, dacron polyester, a polyester/Kevlar composite, or, for higher heat applications, a polyester/glass combination. As is known, the bag is filled with adsorbent such as, for example, silica gel, metal alumino silicate, alumina, calcium sulfate, activated charcoal, molecular sieve, or any other suitable adsorbent, which is preferably in bead, pellet, or granular form. After being filled with adsorbent, the bag can be closed by any suitable means, such as sewing, stitching, bonding, fusing, etc.

Further specific features of the present invention will be described in detail subsequently.

DESCRIPTION OF PREFERRED EMBODIMENTS

Referring now to the drawings in detail, FIG. 1 illustrates one embodiment of an inventive adsorbent package or bag, also known as a desiccant bag, in place in an automotive air conditioning refrigerant dryer. It should be noted that the drawing illustrates only one possible application of the inventive package, which could be used, for example, in any receiver of a refrigeration system, for example to adsorb moisture or any other undesirable material from the refrigerant.

In the illustrated embodiment of an automotive air conditioning refrigerant dryer, the system operates as follows. Gaseous liquid refrigerant coming from a condenser flows through the tube 1 into the dryer can 2, where it impinges upon a reflector 3 to achieve good distribution of the refrigerant in the can 2 Moisture that might have been present in the refrigerant is adsorbed by the desiccant bag or package 10, and the "dried" refrigerant, along with any oil that may have separated therefrom and settled to the bottom of the can 2, is withdrawn via the filter 4 and the suction tube 5.

The inventive desiccant bag 10 is made of porous material, preferably composite material that is resistant to high temperatures. The bag itself contains adsorbent, such as, for example, silica gel, metal alumino silicate, alumina, calcium sulfate, activated charcoal, molecular sieve, or any other suitable material, generally in bead, pellet, or granular form. In addition. the inventive adsorbent bag 10 offers a high ratio of adsorbent weight to package surface area.

The inventive bag 10 is furthermore provided with a foil 11 for example aluminum foil so that after initial placement of the bag 10 in the can 2, the can 2 can be welded together at the location indicated by the reference numeral 6 without damaging the bag In other words, the foil 11 functions as a heat shield to protect the material of the bag, for example polyester felt, from, for example, a weld arc when the two sections of the can 2 are welded together. The foil 11 functions as a reflector or barrier from the intense heat generated during the welding process. However, despite the presence of the foil 11, sufficient adsorbent surface area is left free on the bag 10 for the same to satisfactorily perform its function of adsorbing moisture from the refrigerant that passes through the can 2.

The foil 11 can be disposed at any suitable location on the bag 10 to accommodate different weld joint locations on the can 2. For example, in the embodiment of the inventive bag 10 illustrated in FIGS. 1 and 2, the foil 11 is disposed in a central portion of the bag. In the alternative embodiment illustrated in FIG. 3, in contrast, the foil 11A is disposed at one end of the bag 10A. Any other suitable location on the bag would also be appropriate. In addition, the percentage of the bag 10, 10A that is covered by the foil 11, 11A can vary in conformity with the particular application.

To ensure that the foil 11, 11A will remain in the proper position on the bag 10, 10A during the welding operation as well as during subsequent use, the foil must be secured to the bag. This is necessary to ensure that the foil does not come loose, thereby not only nullifying its intended function of protecting the bag during welding together of the can sections, but also possibly forming a blockage to the flow of refrigerant in the system.

To secure the foil 11, 11A to the bag 10, 10A in a reliable and economical manner, e.g. so that an automated process is possible, that side of the foil that rests against the bag is laminated with a heat sealing material, preferably polyethylene, so that the foil can be heat sealed to the material of the bag via the lamination The two ends of the foil preferably overlap one another, as indicated in exaggerated fashion by the reference numeral 12 in FIG. 2. So that these two overlapping ends will adhere to one another, that side of the foil remote from the bag is also laminated, but this time with nylon. When tho foil is heat fused to the bag, for example at 350° F., the polyethylene and nylon bond to one another where the ends of the foil overlap.

It should be noted that although in the illustrated application of FIG. 1, a single bag only is shown, two or more bags could also be used in a refrigeration system.

It should be noted that the bag 10, 10A can have any suitable configuration, with the shape of the bag being primarily a function of its intended application and the space restrictions of the container in which the bag is disposed By way of example only, the bag 10 could, as shown in FIGS. 1 and 2, have linear ends. Alternatively, one or both ends of the bag 10A (FIG. 3) could be crimped so as to prevent damage to the bag when the same is placed in a container.

The present invention is, of course, in no way restricted to the specific disclosure of the specification and drawing, but also encompasses any modifications within the scope of the appended claims.

What we claim is:

1. An adsorbent package that is resistant to high temperature, comprising:
    a bag that contains adsorbent; and
    a foil wrapping that is disposed about a portion of said beg, with said foil wrapping having a first side that is disposed adjacent said bag and is laminated with a heat sealing material via which said foil wrapping is connected to the material of said bag, with said heat sealing material being polyethylene, whereby said foil wrapped has two ends that overlap one another, and said foil wrapping has a second side that is remote from said bag and is laminated with nylon.

2. An adsorbent package according to claim 1, in which said foil wrapping is made of aluminum.

3. An adsorbent package according to claim 1, in which said foil wrapping is disposed in the vicinity of an end of said bag.

4. An adsorbent package according to claim 1, in which said foil wrapping is disposed in the vicinity of a central portion of said bag.

5. An adsorbent package according to claim 1, in which said foil wrapping is disposed about up to 50% of the surface of said bag.

6. An adsorbent package according to claim 1, in which said bag is made of plastic fibrous material.

7. An adsorbent package according to claim 6, in which said material is selected from the group consisting of polyester felt, dacron polyester, a polyester/Kevlar composite, and a polyester/glass combination.

8. An adsorbent package according to claim 1, in which said bag has linear ends.

9. An adsorbent package according to claim 1, in which said bag has at least one crimped end.

* * * * *